United States Patent
Buendgen et al.

(10) Patent No.: US 12,120,222 B2
(45) Date of Patent: Oct. 15, 2024

(54) DEPLOYING A SYSTEM-SPECIFIC SECRET IN A HIGHLY RESILIENT COMPUTER SYSTEM

(71) Applicant: International Business Machines Corporation, Armonk, NY (US)

(72) Inventors: Reinhard Theodor Buendgen, Tuebingen (DE); Brian Walter Stocker, Port Ewen, NY (US); Nicolas Maeding, Holzgerlingen (DE); Jonathan D. Bradbury, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 17/393,449

(22) Filed: Aug. 4, 2021

(65) Prior Publication Data
US 2023/0040468 A1 Feb. 9, 2023

(51) Int. Cl.
*H04L 9/08* (2006.01)
*G06F 21/72* (2013.01)
(Continued)

(52) U.S. Cl.
CPC .............. *H04L 9/085* (2013.01); *G06F 21/72* (2013.01); *H04L 9/0822* (2013.01);
(Continued)

(58) Field of Classification Search
None
See application file for complete search history.

(56) References Cited

U.S. PATENT DOCUMENTS 10,423,805 B2 * 9/2019 Boivie .................... G06F 21/75
10,855,465 B2 * 12/2020 Brickell ................ H04L 63/062
(Continued)

FOREIGN PATENT DOCUMENTS

GB  2602208 A * 6/2022  ......... G06F 21/6209
KR  20220091578 A * 11/2020  ......... H04L 63/0884

OTHER PUBLICATIONS

International Search Report and Written Opinion for International Application No. PCT/EP2022/069070; International Filing Date: Jul. 8, 2022; Date of mailing: Oct. 20, 2022; 13 pages.

*Primary Examiner* — Saleh Najjar
*Assistant Examiner* — Shadi H Kobrosli
(74) *Attorney, Agent, or Firm* — CANTOR COLBURN LLP; Edward Wixted

(57) ABSTRACT

A computer-implemented method for providing a system-specific secret to a computing system having a plurality of computing components is disclosed. The method includes storing permanently a component-specific import key as part of a computing component and storing the component-specific import key in a manufacturing-side storage system. Upon a request for the system-specific secret for a computing system, the method includes identifying the computing component comprised in the computing system, retrieving a record relating to the identified computing component, determining the system-specific secret protected by a hardware security module and determining a system-specific auxiliary key. Furthermore, the method includes encrypting the system-specific auxiliary key with the retrieved component-specific import key, thereby creating a auxiliary key bundle, encrypting the system-specific secret and storing the auxiliary key bundle and a system record in a storage medium of the computing system.

18 Claims, 10 Drawing Sheets

(51) Int. Cl.
*H04L 9/14* (2006.01)
*H04L 9/32* (2006.01)

(52) U.S. Cl.
CPC .......... *H04L 9/0825* (2013.01); *H04L 9/0891* (2013.01); *H04L 9/14* (2013.01); *H04L 9/3247* (2013.01)

(56) References Cited

U.S. PATENT DOCUMENTS

| | | | |
|---|---|---|---|
| 11,184,157 B1* | 11/2021 | Gueron | .................... H04L 9/14 |
| 11,405,201 B2* | 8/2022 | Brickell | ................ H04L 63/061 |
| 2012/0137137 A1* | 5/2012 | Brickell | .................. G06F 21/73 |
| | | | 713/182 |
| 2018/0062835 A1* | 3/2018 | Hamel | .................. H04L 9/0894 |
| 2018/0157839 A1 | 6/2018 | Pearson | |
| 2018/0198628 A1 | 7/2018 | Hojsik et al. | |
| 2018/0373879 A1* | 12/2018 | Lango | ................ H04L 63/0428 |
| 2019/0220602 A1 | 7/2019 | Ruan et al. | |
| 2019/0228163 A1 | 7/2019 | Lang et al. | |
| 2022/0382911 A1* | 12/2022 | Morav | .................... G06F 21/79 |
| 2023/0010345 A1* | 1/2023 | Khatri | ...................... G09C 1/00 |
| 2023/0011005 A1* | 1/2023 | Khatri | ..................... G06F 21/64 |
| 2023/0020193 A1* | 1/2023 | Williams | .............. H04L 9/0852 |
| 2023/0090972 A1* | 3/2023 | Rezaei | ................. H04L 9/3226 |
| | | | 713/171 |

\* cited by examiner

100

| 102 | storing permanently a unique component specific import key |

↓

| 104 | storing the unique component specific import key in a manufacturing-side storage system |

↓

| 106 | upon a request for a secure host key for a specific host computer |
| 108 | identifying which computing component are comprised in the specific host computer |
| 110 | retrieving a record relating to the unique component specific import key from the manufacturing-side storage system |
| 112 | determining the system specific secret ... |
| 113 | determining a system-specific auxiliary-key .. |
| 114 | encrypting the system-specific secret with each of said retrieved component specific import key ... |
| 115 | encrypting the system-specific secret ....... |
| 116 | storing the auxiliary key bundle and a system record ... |

FIG. 1

DEPLOYING A SYSTEM-SPECIFIC SECRET IN A HIGHLY RESILIENT COMPUTER SYSTEM

BACKGROUND

The invention relates generally to a method for providing a system-specific secret to a computing system, and more specifically, to a computer-implemented method for providing a system-specific secret to a computing system comprising a plurality of computing components. The invention relates further to a related hardware secret deployment system, and a computer program product.

Securing data as well as communication lines continues to occupy top position for enterprise IT (information technology) management. This is not only required because of governmental directives (e.g., GDPR, the General Data Protection Regulation of the EU) but also because of the lost credibility into an enterprise inability to protect customer data—and thus revenue and profit losses—in case of compromised customer data records. It turns out that data protection and providing secure computing platforms is not only a software problem but may start with the way components of computer systems are manufactured and controlled during deployment. This may not yet be a natural environment for mass-market CPU-chips used in microcontrollers, personal computers, mobile phones or home automation devices. However, for highly trusted computing environments, as those being used in the financial, insurance or government industry sectors, it becomes more and more relevant to prove that from a technology perspective data breaches can be prohibited with a very high probability. This may require some additional high-tech components and supporting processes; but the related success in terms of data security pays for the additional effort.

Although hardware security modules have already been used for some time, guaranteeing that some modules in a larger computing complex are not compromised is a more complex task.

SUMMARY OF THE INVENTION

According to one aspect of the present invention, a computer-implemented method for providing a system-specific secret to a computing system having a plurality of computing components is provided. The method includes storing permanently a component-specific import key as part of a computing component and storing the component-specific import key in a manufacturing-side storage system. Upon a request for the system-specific secret for a computing system, the method includes identifying the computing component comprised in the computing system, retrieving a record relating to the identified computing component, determining the system-specific secret protected by a hardware security module and determining a system-specific auxiliary key. Furthermore, the method includes encrypting the system-specific auxiliary key with the retrieved component-specific import key, thereby creating a auxiliary key bundle, encrypting the system-specific secret and storing the auxiliary key bundle and a system record in a storage medium of the computing system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited. Embodiments of the invention will be described, by way of example only, and with reference to the following drawings.

FIG. 1 shows a block diagram of an embodiment of the inventive computer-implemented method for providing a system-specific secret to a computing system comprising a plurality of computing components.

DETAILED DESCRIPTION

Figure 2:
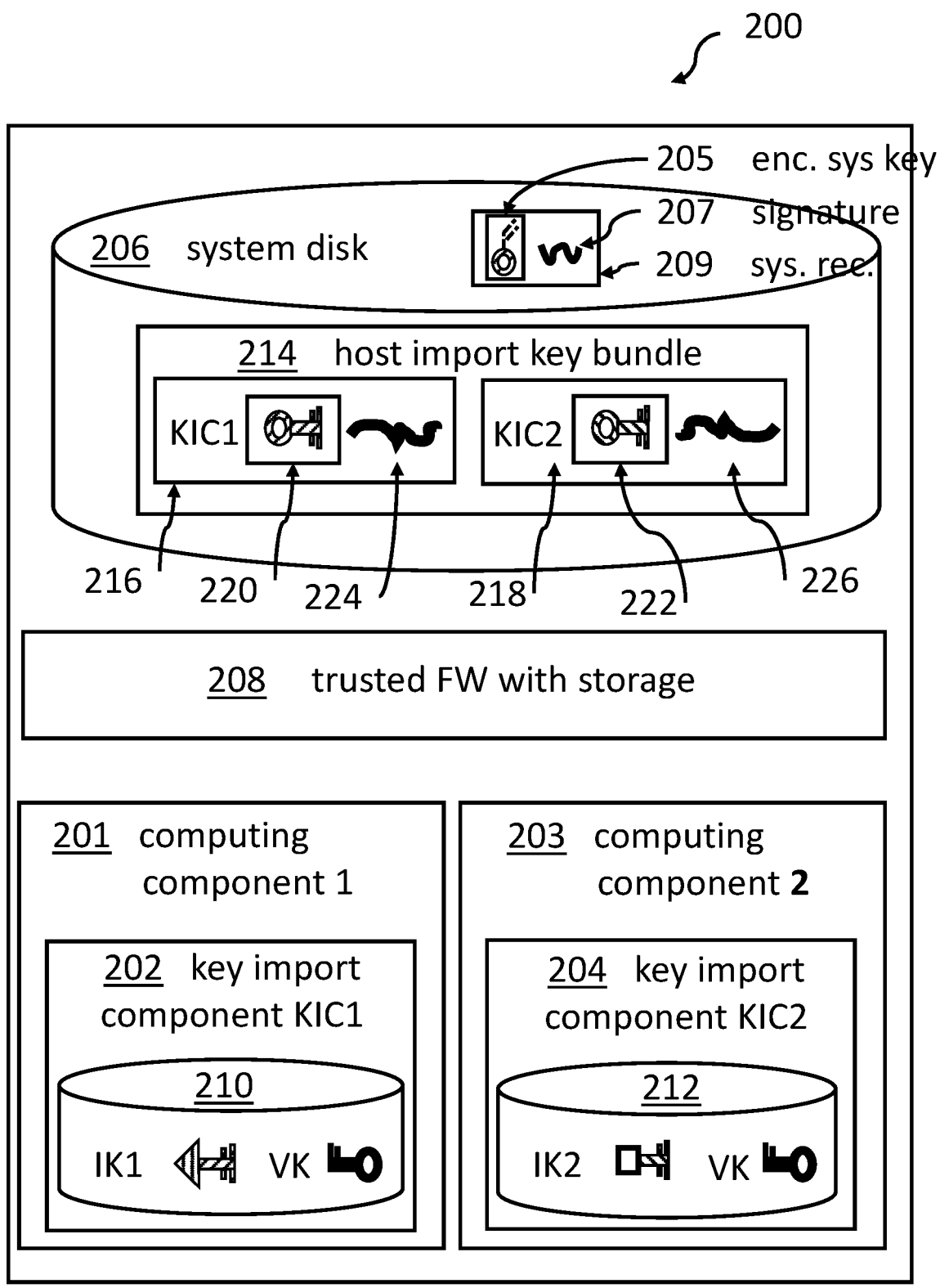
FIG. 2 shows a block diagram of an embodiment of a specific computing system comprising a plurality of computing components.

According to one aspect of the present invention, a computer-implemented method for providing a system-specific secret to a computing system having a plurality of computing components is provided. The method includes storing permanently a component-specific import key as part of a computing component during manufacturing of the computing component, and storing the component-specific import key in a manufacturing-side storage system. Upon a request for the system-specific secret for a computing system, the method may comprise identifying, in the manufacturing-side storage system, the computing component comprised in the computing system, retrieving, from the manufacturing-side storage system, a record relating to the identified computing component from the manufacturing-side storage system, the record comprising a unique component-specific import key, determining the system-specific secret protected by a manufacturing-side hardware security module, and determining a system-specific auxiliary key protected by a manufacturing-side hardware security module.

Moreover, the method can comprise encrypting, on the manufacturing side, the system-specific auxiliary key with the retrieved component-specific import key, thereby creating an auxiliary key bundle, wherein the auxiliary key bundle includes a bundle record comprising a reference to the computing component to which the component-specific import key relates and the system-specific auxiliary key encrypted by the component-specific import key.

Additionally, the method may comprise encrypting the system-specific secret with the system-specific auxiliary key and storing the auxiliary key bundle and a system record comprising the encrypted system-specific secret in a storage medium of the computing system.

According to another aspect of the present invention a hardware secret deployment system for providing a system-specific secret to a computing system comprising a plurality of computing components for confidential computing may be provided. The system may comprise one or more processors and a memory communicatively coupled to the one or more processors, wherein the memory stores one or more program code portion that, when executed by the one or more processors, enable the one or more processors to store permanently a component-specific import key as part of a computing component during manufacturing of the computing component and store the component-specific import key in a manufacturing-side storage system.

Upon a request for the system-specific secret for a computing system, the processor may also be enabled to identify, in the manufacturing-side storage system, the computing component comprised in the computing system, retrieve, from the manufacturing-side storage system, a record relating to the identified computing component from the manufacturing-side storage system, the record comprising a unique component-specific import key, determine the system-specific secret protected by a manufacturing side hardware security module, and determine a system-specific auxiliary key protected by a manufacturing-side hardware security module.

In exemplary embodiments, the processor may be enabled to encrypt, on the manufacturing side, the system-specific auxiliary key with the retrieved component-specific import key, thereby creating an auxiliary key bundle, wherein the auxiliary key bundle includes a bundle record comprising a reference to the computing component to which the component-specific import key relates and the system-specific auxiliary key encrypted by the component-specific import key. Moreover, the processor may be enabled to encrypt the system-specific secret with the system-specific auxiliary key, and to store the auxiliary key bundle and a system record comprising said encrypted system-specific secret in a storage medium of the computing system.

The computer-implemented method for providing a system-specific secret to a computing system comprising a plurality of computing components may offer multiple advantages, technical effects, contributions and/or improvements:

The solution presented may allow a manufacturer of a computer system or of components thereof to safely vouch for having created the system-specific secret which may also include the ability to revoke a system-specific secret which origin cannot be proven without any doubt.

Additionally, it may be ensured by the concept proposed here that the system-specific secret is persistent, i.e., survive a system restart. The proposed concept may also rely on and permit redundant components for a computer system, for which the computing components may be manufactured independently of the system or may later be added to an already existing computing system.

This may makes it also possible to replace any of such components during the lifetime of the system. Furthermore, it may be ensured by the presented solution that the system-specific secret cannot be accessed by any management interface—e.g., systems management software, controls or similar—or any operator activity. Therefore, the system-specific secret may only be known to the firmware in plain text—in particular, the trusted firmware—of the computer system and neither to the user/owner of the computer system nor to the manufacturer of computing components of the computer system. Even a corruption of any component of the computer system may not impact the confidentiality of the system-specific secret or any other component of the computer system. However, in case a computing component of the computer system has been compromised and the system-specific secret has been leaked, it must be replaceable without changing that specific part of the computing system, i.e., the computing component. The here proposed solution may allow this elegantly.

The concept proposed here may go far beyond concepts that maintain a secret in a trusted platform module (TPM), using a randomly generated key for which no redundancy is possible or, providing a manufacturing supply key which is only component-specific to the computing system. Also the disadvantages of systems for which the manufacturer is not be able to revoke a system-specific secret because the manufacturer may not maintain control over the system-specific secret in a non-clear-text-form may be overcome.

Furthermore, the presented solution addresses the strong requirements of RAS (reliability, availability serviceability) allowing redundancy for a system-specific key so that component may be manufactured independently and may be independently replaceable. Moreover, also multiple systems may be equipped with the same system-specific key in a completely controllable manner.

Additionally, the implemented concept of a sort of double protection using an auxiliary key comprised in protected for in the computing components may allow deleting the original random system key or any data that can be used to re-establish the system specific key from any storage in manufacturing after the system record containing the encrypted system specific secret was placed on the manufactured system. It may no longer be required; however, on the other side, it is also possible to also protect the integrity of the computing system even if replacement parts are installed for the computing system-either as a preventive maintenance task or in case of a failure of a computing component.

According to an embodiment of the method, the auxiliary key bundle may comprise at least one—in particular a plurality of—bundle record/s, and the method may also comprise searching, by the computing system, in the auxiliary key bundle a record with the reference to the computing component that matches one of the computing components of the computing system, sending the system record comprising the encrypted system-specific system record and the found bundle record comprising the system-specific auxiliary key encrypted by the component-specific import key to that computing component, decrypting, by the computing component, the encrypted computing system-specific auxiliary key from said bundle record with the computing component-specific import key stored in the computing component—in particular a symmetric key-decrypting, by said computing component, the encrypted system-specific secret from said system-specific record using the system-specific auxiliary key, and returning, by the computing component, the system-specific secret to a firmware of the computing system.

Hence, the firmware—in particular, a trusted firmware—may now have access to the system-specific secret which has been on its way to the trusted firmware never outside the computing component or the trusted firmware available in clear text form. No other computing component in the computing system was required to make the system-specific secret available for secure computing or secure communication, e.g., to other computing systems having undergone a similar procedure, i.e., also have access to their own system-specific secret.

According to an embodiment, the method may also comprise maintaining, by the manufacturing-side, a manufacturing-side signing key and storing a verification key associated with a manufacturing-side signing key permanently in the computing system, in particular, in the computing component. Thereby, the creation of a bundle record may also comprise determining—in particular, computing-a signature of the system-specific auxiliary key encrypted by the component-specific import key and the reference to the computing component with a manufacturing-side signing key, determining a signature for said system record, and adding the signature for the system record to the system record (later denoted also as HIKB—host import key bundle). A manufacturing-side server may control the transmission of the host import key bundle to the system disk of the computing system. Each record of the HIKB may comprise a signature.

According to another embodiment, the method may also comprise verifying, by the computing system, the bundle record and the system record using the verification key stored in the computing system before accessing the auxiliary key or the system-specific secret. These verifications may be controlled by the firmware, and more specifically, by a cooperation of the computing component in question and the firmware.

Thereby, it may also be possible that storing the auxiliary key bundle and/or the system record in/on a storage medium of the computing system may also comprise, sending the auxiliary key bundle and/or the system record over a system support channel—e.g., a call-home support mechanism—to the specific computing system for which an updated auxiliary key bundle and/or a new system-specific secret was requested. This origin of such a new auxiliary key bundle and/or system record may be a manufacturing facility of the computing component.

In such a context and according to an embodiment of the method, the storing of the auxiliary key bundle may also comprise changing the plurality of computing components of the computing system, and replacing an existing auxiliary key bundle on a storage medium—e.g., the system disk of the computing system-being a part of said specific computing system by a new auxiliary key bundle relating to an updated version of said computing system. This may be a useful feature when a computing component on a computing system needs to be repaired. Replacing the computing component may also be useful when the computing system is updated—or the like. It may also become elegantly possible to replace both an old auxiliary key and an old system-specific secret by new ones in case the old system-specific auxiliary key may need to be revoked.

According to one embodiment of the method, the firmware to which the system-specific secret may be returned to—in particular from the computing component after verification and unwrapping—may be a trusted firmware. Thereby, the system-specific secret may be stored in memory of the computing system that is only accessible by that trusted firmware. Access to the system-specific secret by unauthorized personnel may therefore never be possible at interface at the application or command interfaces.

According to an embodiment of the method, the trusted firmware may be protected against an access through a systems management system and/or an operator command of the computing system and/or software not loaded as trusted firmware into the computing system. This way, the computing platform may be compliant with requirements necessary for a confidential computing platform of the highest security and confidentiality level.

According to an embodiment of the method, the computing component may be manufactured independently of the specific computing system. Thus, the computing component may be installed or used as an upgrade component after the initial usage of the specific host computer at a customer site, i.e., firstly installed after it may have left manufacturing. Furthermore, the system—i.e., host system—can also be assembled from an arbitrary set of pre-manufactured components.

According to an embodiment of the method, the manufacturing-side signing key may be protected—i.e., encrypted or wrapped—by a manufacturing-side hardware security module. Hence also not anybody in manufacturing may know the plain text signing key.

According to another embodiment of the method, the system-specific secret may also be a cryptographic key generated and protected by a manufacturing-side hardware security module. Hence, also for the system-specific secret it is true that not anybody in manufacturing may know the plaintext secret.

According to a embodiment of the method—in particular, from a perspective of the manufacturing side—the method may comprise generating the—or better, each—component-specific import key by a true random number generator—in particular, on the manufacturing-side-storing securely the component-specific import key in the computing component—also and in particular during the manufacturing—and sending the component-specific import key to a manufacturing-side hardware security module via a secure channel.

Furthermore, the method may comprise, in this context and this embodiment, importing the component-specific import key to the manufacturing-side hardware security module and storing the component-specific import key in the manufacturing-side storage system as an object protected by the manufacturing-side hardware security module. Hence, also the component-specific import key would not be available in clear text to anybody.

According to another embodiment, the method may also comprise storing the verification key associated with the manufacturing-side signing key in the computing component and using the verification key by the computing component to verify the signature of each encrypted system-specific secret before decrypting the system-specific secret. Hence no mismatch may be generated between computing components of the computing system and the system secrets encrypted with a decryption key of a component.

According to an embodiment, the method may also comprise using the system-specific secret as a base secret of a trusted execution environment for confidential computing. This may be, e.g., using the system-specific secret as a core key for an encrypted or otherwise protected communication to other computing systems being equipped with matching keys to establish a secure communication channel.

According a further embodiment, the method may comprise upon generating a new system-specific auxiliary key for the computing system also a new system-specific secret may be determined and a new auxiliary key bundle and a new system record comprising the encrypted system-specific secret may be stored in the storage medium of the computing system. This may close the loop for the secret computing in respect to maintenance activities and replacements of system components (i.e., computing components of the computing system).

According to another embodiment, the method may comprise deleting the system-specific secret after the storing of the system record comprising the system specific secret wrapped by the auxiliary key in a storage medium of said computing system. Thus, may be executed immediately after the system record comprising the encrypted system-specific secret is stored in a storage medium of the computing system, i.e., the secret has been delivered to the computing system to be shipped to a customer.

In the context of this description, the following conventions, terms and/or expressions may be used:

The term 'system-specific secret' may denote a binary value which may be created specifically for a specific computing system to enable the specific computing system to act as a secure computing platform. In particular, the system-specific secret may be a cryptographic key, like, for example, the private part of a symmetric key pair. The system-specific secret may never be available in clear text, neither at the manufacturing side nor to the user or any of its software systems. The system-specific secret may be generated randomly, be protected and stored persistently according to predefined rules and, deleted in its clear text version again. An access to the system-specific secret in clear text may only be possible using the predefined protection schema and keys.

The term 'auxiliary key' may denote a cryptographic key which may either be a symmetric key or the private key of a pair of asymmetric keys. Being able to choose symmetric keys as auxiliary keys bears the advantage that symmetric keys are typically smaller than asymmetric keys. This advantage is considerable for those concerned about quantum safe cryptography. For each computing system a system specific auxiliary key shall be chosen. The auxiliary key of a system is used to import the system specific secret into the system. Therefore, it is also called host import key (HIK).

The term 'computing system' may denote a larger computer system comprising a plurality of computing components like a central electronic complex (CEC), a co-processor, secure appliances, network processors, and the like.

The term 'computing component' may denote a portion of a larger computing system, wherein the computing component may comprise at least rudimentary computing capabilities and some memory. Additionally, the computing component may comprise the key import component. This component may allow providing—or make available upon request—the system specific key to the firmware. The key import component may have all required capabilities and password and decryption capabilities to verify a auxiliary key bundle record or a system record and to unwrap auxiliary host key and the system specific secret. Each computing component may have its own key import component with key import component specific passwords and keys. As a special case the key import component may be the only element the computing component includes.

The term 'confidential computing' may denote here, e.g., the usage of encryption and decryption keys only available to a trusted firmware of a computing system. The keys may not be available to any user or user software. Fundamentally, the keys may not be available to anybody in clear text form. However, they may be used to secure data on the computing system as well as communication data to another computing system and to enable for confidential computing.

The term 'component-specific import key' may denote a decryption key—in particular, a symmetric key-being instrumental for unwrapping (i.e., decrypting) the system specific auxiliary key and possibly the system-specific secret stored on, e.g., the system disk of the computing system. In case of a usage of a symmetric key pair—although also an asymmetric key pairs may also be possible-one may have the advantages that it may require less storage space, that is may be faster and, that it may be quantum safe.

The term 'during manufacturing' may denote here "during the process of manufacturing a computing component" at a manufacturing site. Hence, as long as the computing component is under the control of the manufacturing site, the computer component may be seen as being 'under construction' or 'in manufacturing'. This may also be valid if production of the computing component may have been physically completed. However, software or data may be loaded into the computing component during this time.

The term 'manufacturing-side storage system' may denote a database (or similar) to store records identifiable by a component identifier and storing the component identifier together with a protected version of the system-specific secret and optionally a signature providing a proof for the fact that the record originates from the manufacturing company.

The term 'hardware security module' (HSM) may denote a hardware element being connected to or integrated into a computer system, e.g., a server system, e.g., here, a manufacturing-side server computer. The HSM is designed to be tamper proof, and to protect a secret, i.e., a software key against unauthorized access, even against physical penetration and/or unscheduled physical de-plugging. The HSM may be closely linked to a CPU or may be operated independently of the CPU. In other words, an HSM is a physical computing device that safeguards and manages one or more digital keys for strong authentication and provides crypto-processing. These modules traditionally may come in the form of a plug-in card or an external device that may be attached directly to a computer or network server.

The term 'auxiliary key bundle' may denote at least one record—typically, a plurality of records—to be stored on, e.g., the system disk of the computer system, wherein each record in the auxiliary key bundle includes at least 3 components: a component identifier, a protected version of the system-specific auxiliary key and a signature.

The term 'bundle record' may denote one of the records of the auxiliary key bundle (later also be denoted as 'host import key bundle').

The term 'storage medium' may denote any form of memory in a computing system or a computing component adapted to store data persistently.

The term 'firmware' or trusted firmware may denote software that may be deeply linked to hardware components of a computer system for which users may be sure that the trusted firmware will only be delivered by one specific trusted vendor and not accessible by any software that can be freely deployed by a customer of that hardware.

The term 'manufacturing-side signing key' may denote a private part of a public/private key pair providing evidence that a record—e.g., a record of the auxiliary key bundle-originates from a predefined manufacturing facility or provider.

The term 'verification key' may denote a public portion of the public/private key pair enabled to provide proof for the fact that a signature may originate from a specific source, e.g., the manufacturer.

The term 'trusted execution environment for confidential computing' may denote a computing environment that allows hosting software to start and host some guest software without the hosting software learning any details on the date of the guest software while the guest software is running. In particular, the host software may be a hypervisor and the guest software may be a virtual machine (aka guest). IBM Secure Execution for Linux, AMD SEV and Intel SGX are examples of trusted execution environments.

In the following, a detailed description of the figures will be given. All instructions in the figures are schematic. Firstly, a block diagram of an embodiment of the inventive computer-implemented method for providing a system-specific secret to a computing system comprising a plurality of computing components is given. Afterwards, further embodiments, as well as embodiments of the hardware secret deployment system for providing a system-specific secret to a computing system will be described.

FIG. 1 shows a block diagram of a embodiment of the computer-implemented method 100 for providing a system-specific secret—i.e., a host key—to a computing system comprising a plurality of computing components. These can comprise CECs (computing execution complex), secure appliances, co-processors, and the like.

The method 100 includes storing, 102, permanently—e.g., using an S-EEPROM or burning it otherwise on or into the related device-a component-specific import key-which will later be denoted as IK1, IK2, . . . . IKn—as part of a computing component during the manufacturing of the computing component. Thereby, the computing component may comprise a computing unit and some memory. The method 100 further includes storing, 104, persistently the component-specific import key—i.e., the IK1, IK2, . . . , IKn—in a manufacturing-side storage system. Hence, the component-specific import key may be available for usage after the manufacturing process. It shall also be mentioned that the import key is stored in form of an HSM (from the manufacturing host) protected key object which makes the clear key value completely inaccessible.

Upon a request 106 for the system-specific secret for a computing system—in particular, a specific computing system of a customer, and automatic computing system ordering system, a hardware partner upgrade ordering system, a security officer who wants an existing system secret replaced by a new one—the method 100 includes, identifying, 108, in the manufacturing-side storage system, the computing component—in particular, identifying a related identifier identifying the computing component—comprised in the computing system. This can happen on the manufacturing-side from a manufacturing database, keeping track of all produced components.

The method 100 further includes retrieving, 110, from the manufacturing-side storage system, a record relating to the identified computing component from the manufacturing-side storage system, the record comprising a unique component-specific import key and determining, 112, the system-specific secret protected by a manufacturing-side hardware security module. This may either be performed by fetching the system-specific secret already generated for that computing system (e.g., in case of a repair or replacement of the computing component in an existing computing system), or by generating a new (random) secret, e.g., in case of the manufacturing of a new computing system, or a replacement of the system secret of an existing computing system.

In the subsequent step, the method 100 also includes determining, 113, a system-specific auxiliary key protected by a manufacturing-side hardware security module step. Typically, the system specific auxiliary key will be a random key generated by the hardware security module and will be stored as an objected protected by the hardware security module together with a system identifier in a data base at manufacturing.

Furthermore, the method 100 includes encrypting, 114, on the manufacturing side, the system-specific auxiliary key with the retrieved component-specific import key—i.e., IK1, etc.—thereby creating a auxiliary key bundle—with a minimum of one entry but typically comprising more entries/records—wherein the auxiliary key bundle includes at least one bundle record comprising a reference to the computing component to which the component-specific import key relates and the system-specific auxiliary key encrypted by the component-specific import key.

Furthermore, the method 100 includes encrypting, 115, on the manufacturing side, the system-specific secret, thereby creating a system record and—typically, often transferring both the auxiliary key bundle and the system record to the computing system from the manufacturing-side computer-storing, 116, the auxiliary key bundle and the system record—in particular to the requesting side—in a storage medium of the computing system. This may typically be the system disk of the computing system.

FIG. 2 shows a block diagram of an embodiment of the specific computing system 200 comprising a plurality of computing components 201, 203 and a system disk 206. Additionally, the computing system 200 includes a trusted firmware (FW) 208 with a related memory or storage. Furthermore, two key import components KIC1, KIC2 are shown—each one of them as an example for a plurality of such key import components. The computing system 200 can comprise a plurality of other components (not shown here), apart from the computing components 201, 203. They may or may not relate to other key import components. I.e., for each computing component comprised in the computing system a related key import component can exist.

Each computing component includes a memory which is here shown as a memory 210 and 212 of the respective key import components 202, 204. However, because the key import components 202, 204 are an integral part of the related computing components 201, 203, a differentiation between a memory 210, 212 of the respective key import component 202, 204 and a memory of the computing component 201 203 itself may only be artificial.

Furthermore, a host import key bundle 214—here only with only two records 216, 218 corresponding to the only two computing components 201, 203 are shown. Normally, for each computing component 201, 203 (and others) of the computing system 200—i.e., for each of the key import components 202, 204-a record 216, 218 is available in the host import key bundle 214.

As can be recognized, each of the records 216, 218 comprise an identifier KIC1, KIC2 for the key import component, a related protected—e.g., encrypted or otherwise secured—system-specific auxiliary key (aka host import key) 220, 222—which may be a symmetric key—as well as a related signature 224, 226. It may be noted that the encryption of the system-specific secret originates from hardware security module (HSM) of a manufacturing-side computer system.

Additionally, the encrypted system key 205 with a related signature 207 is stored on the system disk 206 in form of the system record 209.

Figure 3:
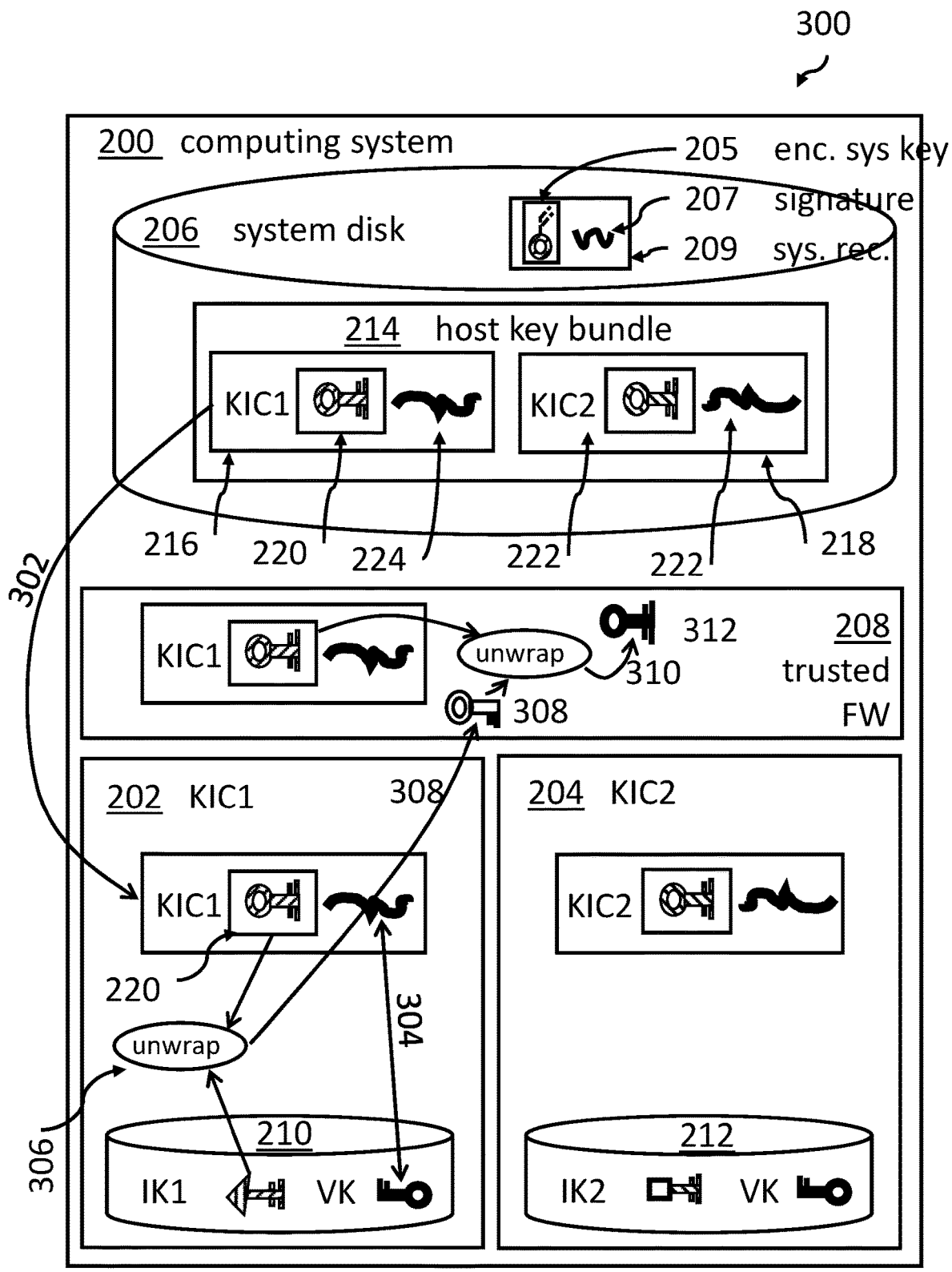
FIG. 3 shows a block diagram of an embodiment of the specific computing system 200 explaining the way the system-specific secret is made available to the trusted firmware.

FIG. 3 shows a block diagram 300 of an embodiment of the specific computing system 200 explaining the way the system-specific secret 308 is made available to the trusted firmware 208, i.e., the flow to unpack the system-specific secret 312. In general, the diagram 300 shows to a large extent the same components as FIG. 2, e.g., the computing system 200, the key import components 202, 204 and so on (however, not the computing component 201, 203). FIG. 3 details the way to unpack the system-specific secret 312 using the unpacked auxiliary key 308 only for the computing component (not shown, compare 201, FIG. 2) belonging to the key import component 202 on the bottom left part of FIG. 3.

Firstly, the record 216 of the host key bundle 214 (or secret bundle, compare above) is made available, 302, to the key import component 202. Here, the record 216 is verified, 304, using the public portion VK stored in the related key import component 202 and a signature component of the record 216 available to the key import component 202. Upon a successful verification of the signature, in a next step, the protected system-specific auxiliary key 220 is unwrapped, 306, using the system-specific import key IK1, here shown as symmetric key IK1. Next, the key import component 202 makes the unprotected—i.e., decrypted—system-specific auxiliary key 308 available to the trusted firmware 208.

The same process may be executed by the key import component 204, however, using a different set of signature and verification keys and a different import key IK2 for the record 218 of the host key bundle 214. This way, the system-specific secret 312 may also be derived from the second computing component relating to the second key import component 204 or any other comparable computing component of the computing system 200. It shall also be mentioned that only one procedure to unpack the auxiliary key by any of the one or more import components is require, leading to resiliency as only one of the installed import components must be functional.

It shall also be mentioned that the unwrapping the system-specific secret 312 can either be performed by the trusted firmware 208—as shown in FIG. 3—or, alternatively, also by the key import component 202 (or 204) in one step.

Next, the focus is shifted from the computing system installed on the user-side to the manufacturing-side and the related processes involved during manufacturing of a computing component.

Figure 4:
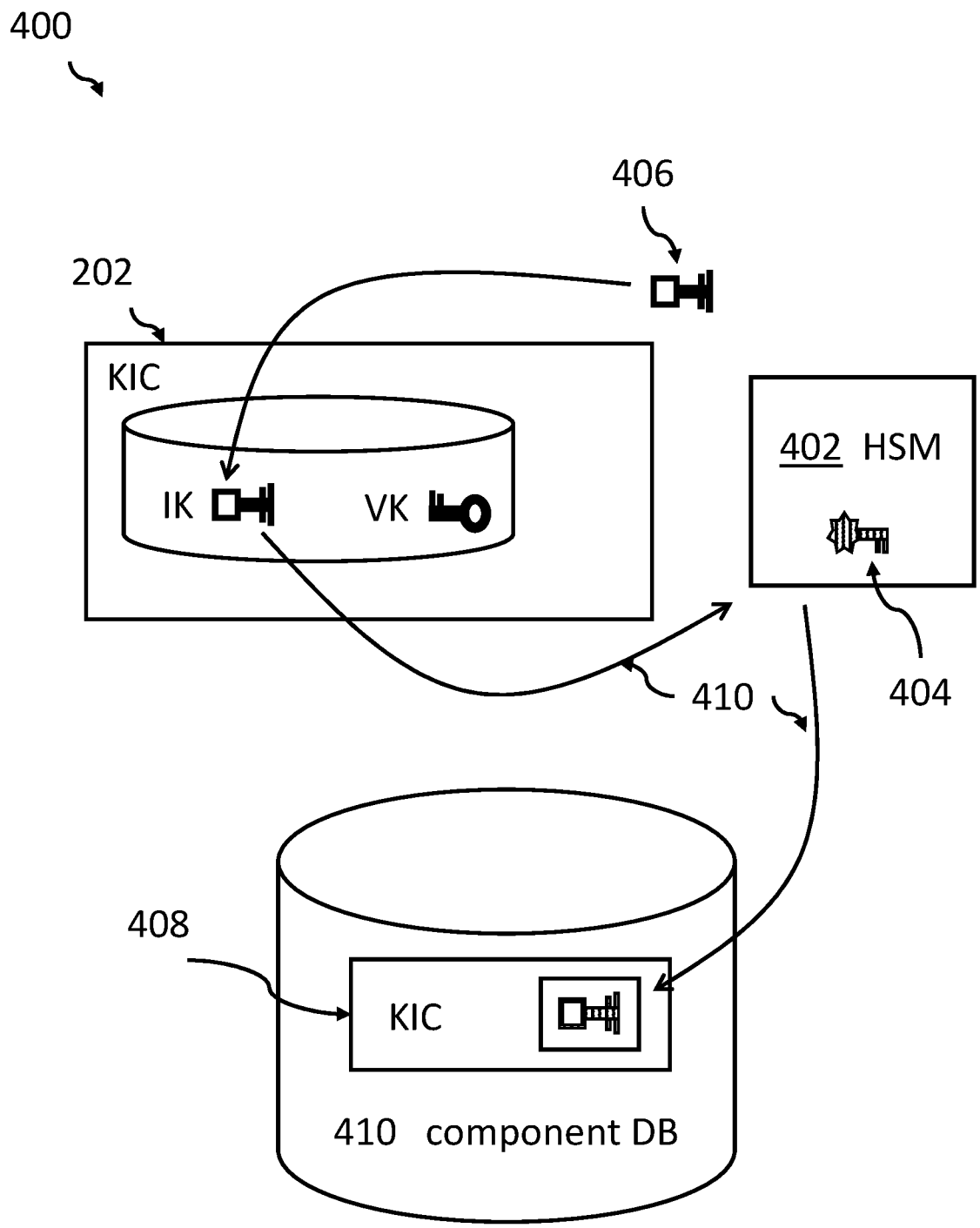
FIG. 4 illustrates an embodiment of a manufacturing of the key import component of a computing component to be used by the computing system.

FIG. 4 illustrates an embodiment 400 of a manufacturing of the key import component of a computing component to be used by the computing system (compare, FIG. 2, 200). A manufacturing-side computing system or server (not shown) includes or controls a hardware security module 402 (HSM) comprising a HSM master key 404.

The component-specific import key IK 406 is generated randomly and stored as part of the key import component 202 KIC which is manufactured together with the related computing component. Furthermore, a public verification key VK associated with the private manufacturing signing key is stored in the key import component 202. The manufacturing component database 410 maintains at least one record for each produced computing component and its related key import component KIC. Furthermore, an identifier KIC of the key import component is maintained as part of the record 408 of the manufacturing component database 410 as well as a component of the record 206 of the host key bundle 214. For this identifier KICx a protection in form of an encryption of the identifier is not required.

To ensure that the component-specific import key IK is not available in clear text to anybody in manufacturing, the import key IK is protected, 412, via the HSM 402 and its master key 404. This way, it is stored in the record 408 of the manufacturing component database 410. Hence, a protected version of the component-specific import key IK is available in the manufacturing component database 410 after the computing component with its key import component KIC has left manufacturing.

Figure 5:
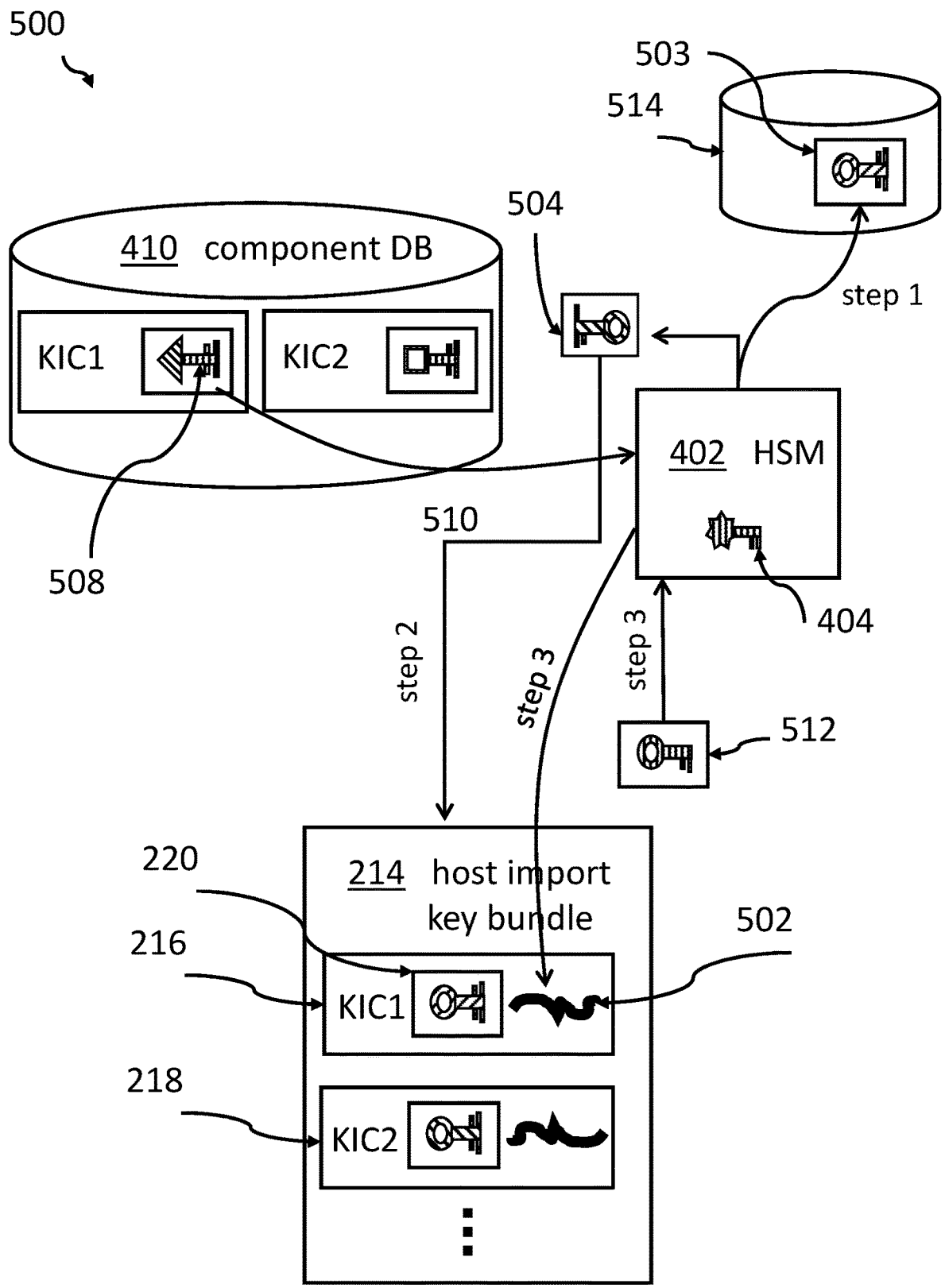
FIG. 5 illustrates an embodiment of the production or manufacturing of the host import key (i.e., system specific auxiliary key) bundle during the manufacturing of the computing system and its related key import component.

FIG. 5 illustrates an embodiment 500 of the production or manufacturing of the host import key bundle (compare FIG. 2, 214) or auxiliary key bundle during the manufacturing of the computing system and its related key import component KIC. The HSM 402 with its HSM master key 404 is used for generating and wrapping the auxiliary key 504 (inside the shown envelope, identical to the auxiliary key 220 of FIG. 2) by the HSM master key 404. The auxiliary key database 514 stores the created and then encrypted system-specific auxiliary key 504 which is protected by the HSM master key 404 (step 1). In a next step (step 2), the system-specific auxiliary key 504 is re-wrapped with the component import key 508, i.e., firstly unwrapped by the HSM MK 404 and then wrapped again by the component import key 508.

In a next step, the components of the record 216 will be signed by the signing key 504 (using an HSM operation) and the resulting signature 502 (originating from the signing key 512 which is shown wrapped with the HSM master key, "step 3") will be added as the rightmost component into the record 216. As mentioned above, the host import key bundle 214 becomes an element of the system disk of the computing system to be delivered to and installed at the user side. Therefore, using this key generation scheme, the unprotected system-specific secret 308 will never occur in in any communication or storage of the manufacturing site.

In a similar way, the protected components specific secret 220 is moved to the host key bundle 214. As a result, the host import key 220 is protected by a component import key 508 of the record of the manufacturing component database 410 using the HSM 402 before it is made a component of the record 216 of the host import key bundle 214. Hence, none of the keys is ever made available in clear text to anybody.

Figure 6:
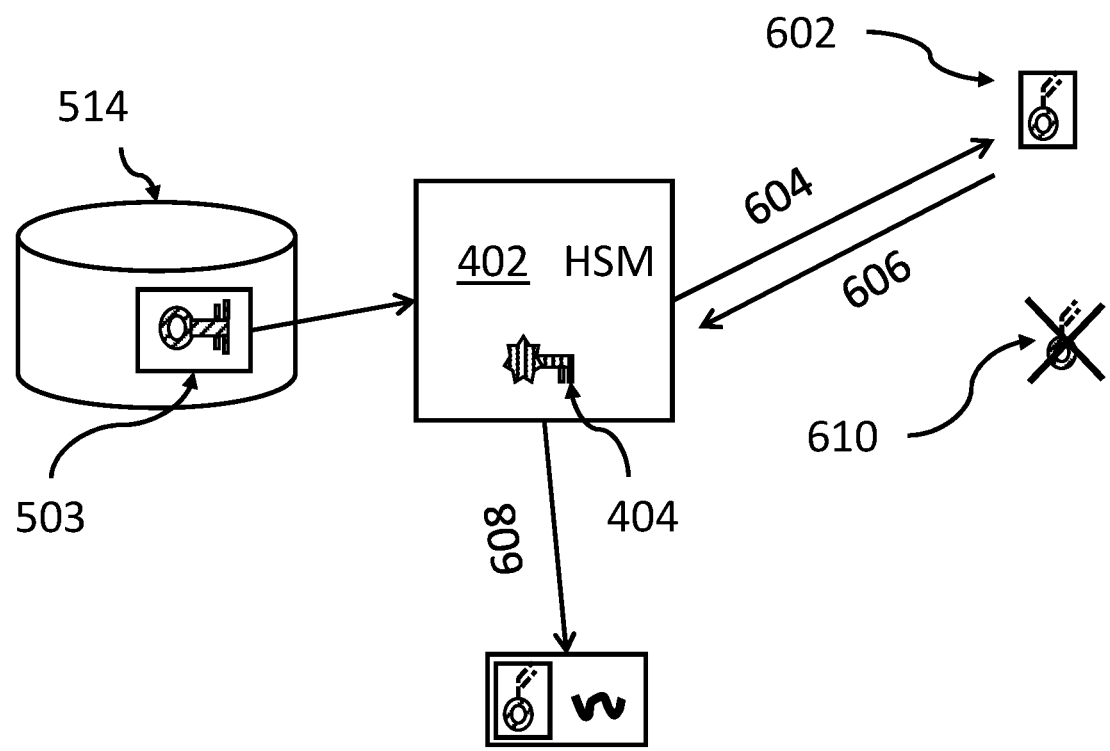
FIG. 6 shows the process of the manufacturing of the host key during the manufacturing of the computing system using host import key (system specific auxiliary key) of the computing system.

FIG. 6 shows the process of the manufacturing of the host key (aka system specific secret). Firstly, a random host key 602 is generated, 604, and used, 606, by the HSM 402. The wrapped system-specific auxiliary key 503 which is protected by the HSM H402 and the master key 404 from the auxiliary key database 514 (compare FIG. 5) is used (i.e., decrypted by the HSM 404) to export, 608, the random host key as wrapped key.

Thereby, the random host key is wrapped by the system-specific auxiliary key 503. I.e., a re-encryption of the system key is performed which may only be possible by the HSM 402. Finally, the random system key 602 can be deleted as shown symbolically by reference numeral 610.

Figure 7:
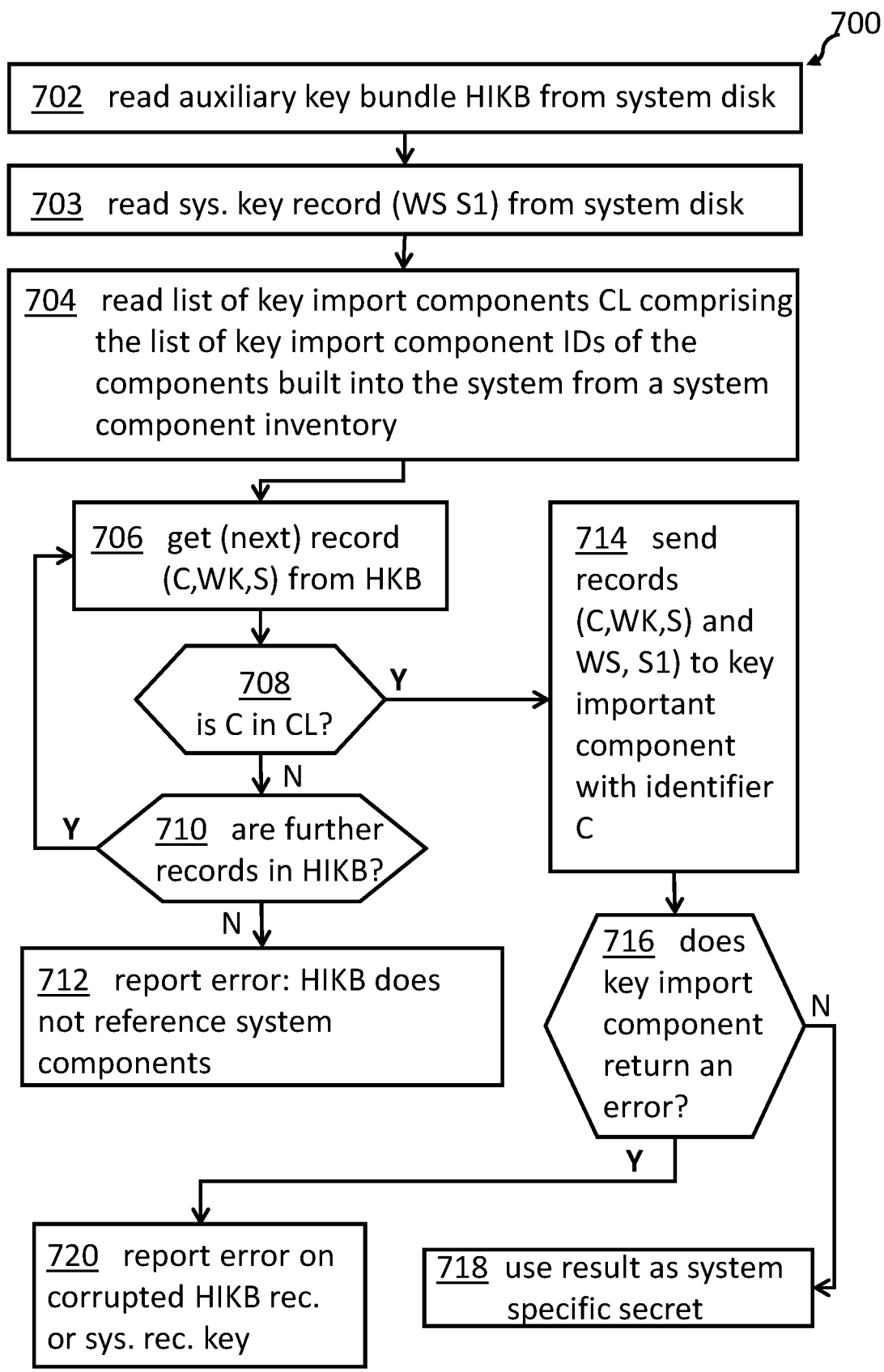
FIG. 7 shows a flowchart illustrating the unpacking of the system-specific secret as part of the trusted firmware flow.

FIG. 7 shows a flowchart 700 illustrating the unpacking of the system-specific secret as part of the trusted firmware flow. Firstly, the auxiliary key bundle HIKB is read, 702, from the system disk of the related computing system. Next, the system key record (WS, S1) is read, 703. Then, the list of key import components CL is read, 704. It includes the list of key import component IDs of the components built into the system from a system component.

In a loop, a next record comprising an identifier C of the key import component, the protected component-specific secret WK and a signature S from the host key bundle is accessed, 706. Then, it is determined, 708, if C is comprised in CL. If that is not the case, it is determined, 710, whether further records are in the host import key bundle (HIKB). If that is the case—case "Y"—the process loops back to reading the next record, 706. If no further record is in the host key bundle—case "N"—an error is reported, 712, that the host import key bundle (HIKB) does not contain any component included in the system.

However, if C is comprised in CL (determination 708) the record together with the system record (WS, S1) is sent, 714, to the key import component with the identifier C. If the key import component does not return an error (616)—case "N"—the result is used, 718, as the system-specific secret.

If the key import component returns an error—case "Y"—an error is reported, 720, indicating a corrupted host import key bundle (HIKB) record or a corrupted system record.

Figure 8:
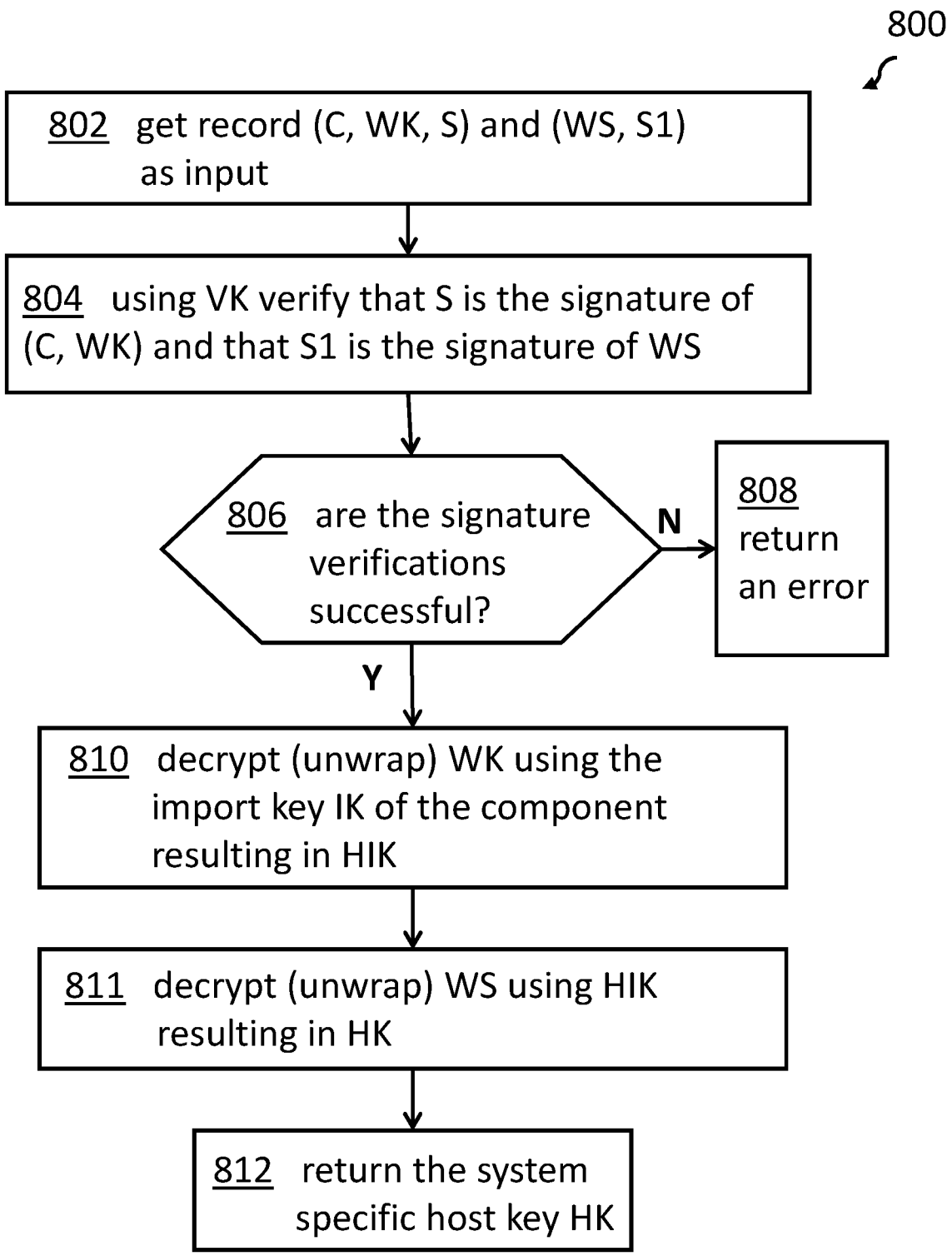
FIG. 8 shows a flowchart detailing the key import component flow, in particular, unpacking the component-specific secret.

FIG. 8 shows a flowchart 800 detailing the key import component flow, in particular unpacking the system-specific secret. The record comprising C, WK, S and the record comprising WS and S1 is used as input, 802. Next, the verification key VK is used, 804, to verify that the signature S is the signature of the record (C, WK) and that S1 is the signature of WS. If that signature verification 806 is not successful—case "N"—an error is returned, 808, and the process stops. Thereby, WK may symbolize the wrapped auxiliary key and WS the wrapped system specific secret (or host key).

In case the signature verification 806 is successful—case "Y"—the process continues with a decryption (unwrapping), 810, WK using the import key IK of the computing component resulting in the relevant host import key. Next, WS is decrypted (i.e., unwrapped), 811, using the host import key resulting in the unwrapped host key. Finally, the system-specific host key (compare 312, FIG. 3) is returned, 812, as a result of the decryption operation—i.e. the unwrapping—to the trusted firmware.

Figure 9:
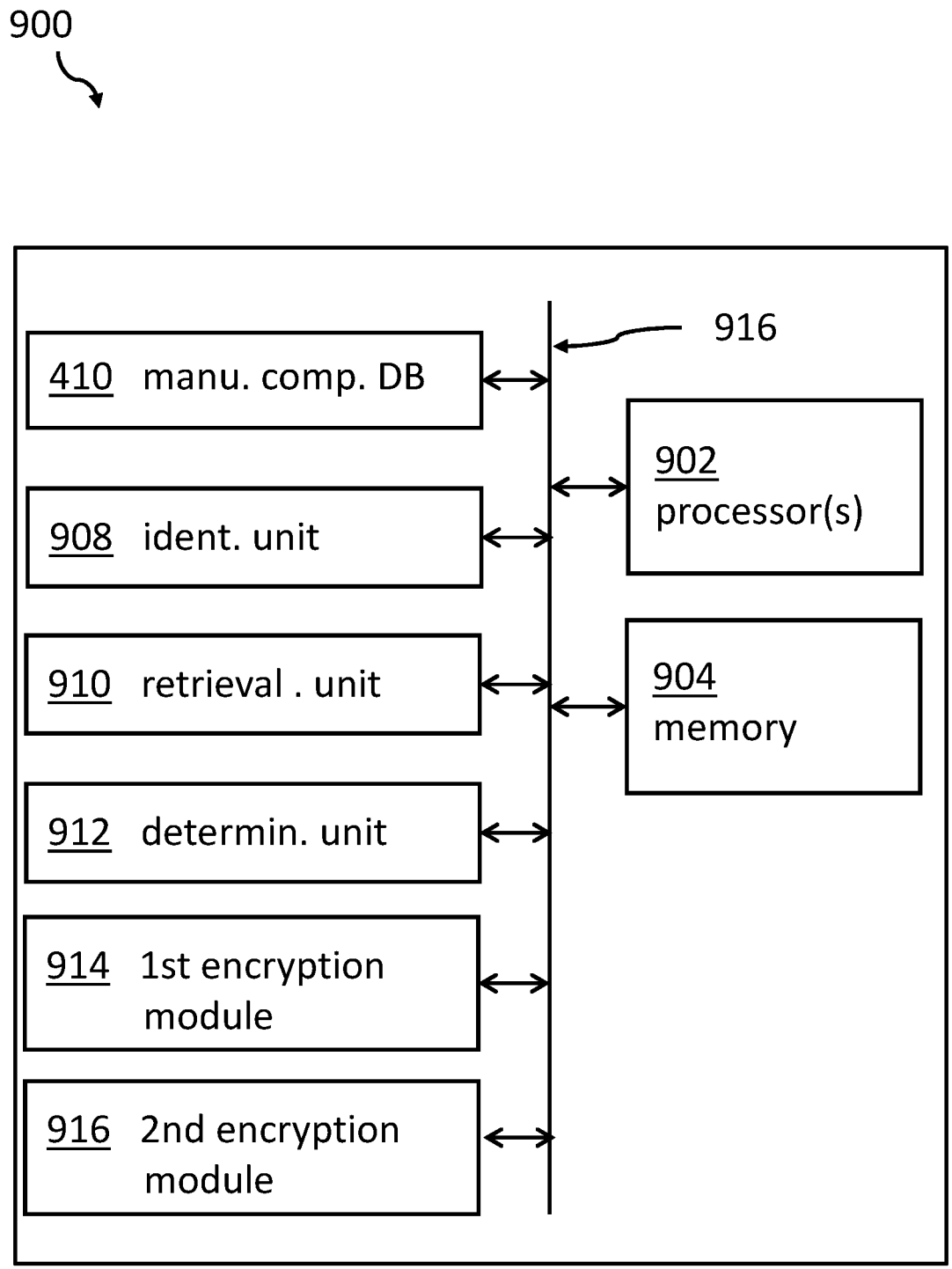
FIG. 9 shows a block diagram of an embodiment of the inventive hardware secret deployment system for providing a system-specific secret to a computing system.

For completeness reasons, FIG. 9 shows a block diagram of a potential embodiment of the hardware secret deployment system 900 for providing a system-specific secret to a computing system. The system 900 includes one or more processors 902 and a memory 904 communicatively coupled to the one or more processors 902, wherein the memory stores one or more program code portion that, when executed by the one or more processors 902, enable the one or more processors 902 to store—in a storage component— permanently a component-specific import key as part of a computing component during manufacturing of the computing component, and to store the component-specific import key in a manufacturing-side storage system—e.g., the manufacturing-side component database 410 (compare 410, FIG. 4). The processor(s) 902 is further enabled when executing the program code from the memory 904—in particular, upon a request for the system-specific secret for a computing system—to identify, in the manufacturing-side storage system,—in particular by an identification unit 908—the computing component comprised in the computing system, to retrieve, from the manufacturing-side storage system by a retrieval unit 910, a record relating to the identified computing component from the manufacturing-side storage system, the record comprising a unique component-specific import key, to determine the system-specific secret—in particular by a first determination unit 912—protected by a manufacturing side hardware security module and, determine—in particular, by a second determination unit 913—a system-specific auxiliary key protected by a manufacturing-side hardware security module The processor(s) 902 is further enabled when executing the program code from the memory 904 to encrypt, e.g., on the manufacturing side by a $1^{st}$ encryption module 914, the system-specific auxiliary key with the retrieved component-specific import key, thereby creating a auxiliary key bundle. Thereby, the auxiliary key bundle includes a bundle record comprising a reference to the computing component to which the component-specific import key relates and the system-specific auxiliary key encrypted by the component-specific import key.

Last but not least, the processor(s) 902 is further enabled when executing the program code from the memory 904 to encrypt—in particular, by a $2^{nd}$ encryption module—the system-specific secret with the system-specific auxiliary key and to store—in particular, by a dedicated storage module (not shown)—the secret bundle in a storage medium of the computing system, in particular, on the system disk (compare 206, FIG. 2).

It shall also be mentioned that all functional units, modules and functional blocks may be communicatively coupled to each other for signal or message exchange in a selected 1:1 manner. Alternatively the functional units, modules and functional blocks can be linked to a common communication backbone 916 for a selective signal or message exchange.

Figure 10:
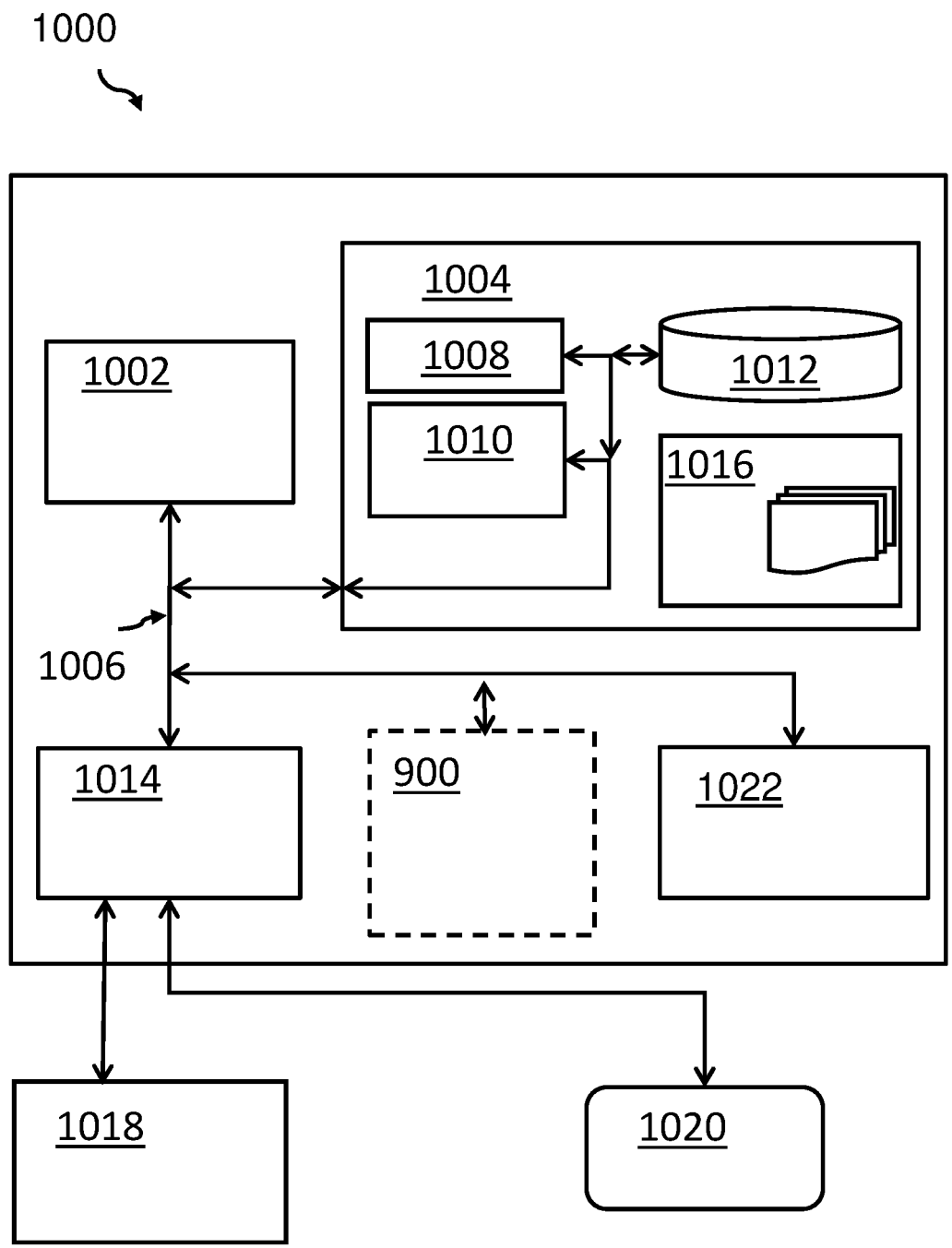
FIG. 10 shows an embodiment of a computing system instrumental for executing the proposed method, at least in parts.

Embodiments of the invention may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, parts of the hardware secret deployment system 1000 for providing a system-specific secret to a computing system may be attached to the bus system 1006. Another compute server may have integrated other parts of the hardware secret deployment system 1000 and the two computers may be in communicative contact.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms includes and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for providing a system-specific secret to a computing system having a plurality of computing components for confidential computing, the method comprising:
   storing permanently a component-specific import key as part of a computing component during manufacturing of said computing component, and
   storing said component-specific import key in a manufacturing-side storage system operated by a manufacture of the computing component, wherein the component-specific import key is protected by a manufacturing-side hardware security module,
   upon a request for said system-specific secret for a computing system:
      identifying, in said manufacturing-side storage system, said computing component comprised in said computing system;
      retrieving, from said manufacturing-side storage system, a record relating to said identified computing component from said manufacturing-side storage system, said record comprising said component-specific import key;
      identifying, from the record, said system-specific secret protected by a manufacturing-side hardware security module;
      identifying, from the record, a system-specific auxiliary key protected by the manufacturing-side hardware security module;
      encrypting, on said manufacturing-side, said system-specific auxiliary key with said retrieved component-specific import key, thereby creating an auxiliary key bundle, wherein said auxiliary key bundle comprises at least one bundle record comprising a reference to said computing component to which said component-specific import key relates and said system-specific auxiliary key encrypted by said component-specific import key;
      encrypting said system-specific secret with said system-specific auxiliary key;
      storing said auxiliary key bundle and a systems record comprising the encrypted system-specific secret in a storage medium of said computing system;
      changing said plurality of computing components of said computing system; and
      based on detecting said changing, replacing an existing auxiliary key bundle on a storage medium being part of said specific computing system by a new auxiliary key bundle relating to an updated version of said computing system.

2. The method of claim 1, wherein said auxiliary key bundle comprises at least one bundle record, and wherein the method further comprises:
   searching, by said computing system, in said auxiliary key bundle a bundle record with said reference to said computing component that matches one of said computing components of said computing system;
   sending said system record comprising said encrypted system-specific record and said found bundle record comprising said system-specific auxiliary key encrypted by said component-specific import key to that computing component;
   decrypting, by said computing component, said encrypted computing system-specific auxiliary key from said bundle record with said computing component-specific import key stored in said computing component;
   decrypting the encrypted system-specific secret from said system-specific record using the system-specific auxiliary key; and
   returning, by said computing component, said system-specific secret to a firmware of said computing system.

3. The method of claim 2, further comprising:
   maintaining, by said manufacturing-side, a manufacturing-side signing key; and
   storing a verification key associated with a manufacturing-side signing key permanently in said computing system, wherein said creation of a bundle record comprises:
      determining a signature of said system-specific auxiliary key encrypted by said component-specific import key and said reference to said computing component with a manufacturing-side signing key;
      determining a signature for said system record; and
      adding said signature for said system record to said system record.

4. The method of claim 3, further comprising verifying, by said computing system, said bundle record and system record using said verification key stored in said computing system before accessing said system-specific secret.

5. The method of claim 3, wherein said firmware to which said system-specific secret is returned to is a trusted firmware, and wherein said system-specific secret is stored in memory of said computing system that is only accessible by that trusted firmware.

6. The method according to claim 5, wherein said trusted firmware is protected against access through at least one of a systems management system, an operator command of said computing system, and software not loaded as trusted firmware into said computing system.

7. The method of claim 3, wherein said manufacturing-side signing key is protected by the manufacturing-side hardware security module.

8. The method of claim 2, wherein said system-specific secret is a key generated and protected by the manufacturing-side hardware security module.

9. The method of claim 2, further comprising:
   generating said component-specific import key by a true random number generator;
   storing securely said component-specific import key in said computing component;
   sending said component-specific import key to a manufacturing-side hardware security module via a secure channel;
   importing said component-specific import key to said manufacturing-side hardware security module; and
   storing said component-specific import key in said manufacturing-side storage system as an object protected by said manufacturing-side hardware security module.

10. The method of claim 3, further comprising:
    storing said verification key associated with said manufacturing-side signing key in said computing component, and
    using said verification key by said computing component to verify said signature of each encrypted system-specific secret before decrypting said system-specific secret.

11. The method of claim 2, further comprising using said system-specific secret as a base secret of a trusted execution environment for confidential computing.

12. The method of claim 2, wherein upon generating a new system-specific auxiliary key for said computing system also a new system-specific secret is determined, and a new auxiliary key bundle and a new system record comprising the encrypted system-specific secret are stored in said storage medium of said computing system.

13. The method of claim 2, further comprising deleting the system-specific secret after the storing of the system record containing the system specific secret wrapped by the auxiliary key in a storage medium of said computing system.

14. A hardware secret deployment system for providing a system-specific secret to a computing system comprising a plurality of computing components for confidential computing, said system comprising:
one or more processors and a memory communicatively coupled to said one or more processors, wherein in said memory one or more program code portions are stored that when executed by said one or more processors, enable said one or more processors to:
store permanently a component-specific import key as part of a computing component during manufacturing of said computing component;
store said component-specific import key in a manufacturing-side storage system operated by a manufacture of the computing component, wherein the component-specific import key is protected by a manufacturing-side hardware security module; and
upon a request for said system-specific secret for a computing system:
identify, in said manufacturing-side storage system, said computing component comprised in said computing system;
retrieve, from said manufacturing-side storage system, a record relating to said identified computing component from said manufacturing-side storage system, said record comprising a unique component-specific import key;
identify, from the record, said system-specific secret protected by a manufacturing-side hardware security module;
identify, from the record, a system-specific auxiliary key protected by the manufacturing-side hardware security module;
encrypt, on said manufacturing-side, said system-specific auxiliary key with said retrieved component-specific import key, thereby creating an auxiliary key bundle, wherein said auxiliary key bundle comprises a bundle record comprising a reference to said computing component to which said component-specific import key relates and said system-specific auxiliary key encrypted by said component-specific import key;
encrypt said system-specific secret with said system-specific auxiliary key; and
store said auxiliary key bundle and a system record comprising said encrypted system-specific secret in a storage medium of said computing system;
change said plurality of computing components of said computing system; and
based on detecting said change, replace an existing auxiliary key bundle on a storage medium being part of said specific computing system by a new auxiliary key bundle relating to an updated version of said computing system.

15. The system of claim 14, wherein said secret auxiliary key comprises at least one of bundle record, and wherein said one or more program code portions, when executed by said one or more processors, enable said one or more processor also to:
search, by said computing system, in said auxiliary key bundle a record with said reference to said computing component that matches one of said computing components of said computing system;
send the system record comprising said encrypted system-specific system record and said found bundle record comprising said system-specific auxiliary key encrypted by said component-specific import key to that computing component;
decrypt, by said computing component, said encrypted computing system-specific auxiliary key from said bundle record with said computing component-specific import key stored in of said computing component;
decrypting the encrypted system-specific secret from said system-specific record using the system-specific auxiliary key; and
return, by said computing component, said system-specific secret to a firmware of said computing system.

16. The system of claim 15, wherein said one or more program code portions, when executed by said one or more processors, enable said one or more processor also to:
maintain, by said manufacturing-side, a manufacturing-side signing key; and
store a verification key associated with a manufacturing-side signing key permanently in said computing system, wherein said creation of a bundle record also comprises:
determining a signature of said system-specific auxiliary key encrypted by said component-specific import key and said reference to said computing component with a manufacturing-side signing key;
adding said signature to said bundle record;
determining a signature for said system record; and
adding said signature for said system record to said system record.

17. The system of claim 16, wherein said one or more program code portions, when execute by said one or more processors, enable said one or more processor also to verify, by said computing system, said bundle record using said verification key stored in said computing system before accessing said system-specific secret.

18. A computer program product for providing a system-specific secret to a computing system comprising a plurality of computing components for confidential computing, said computer program product comprising a non-transitory computer readable storage medium having program instructions embodied therewith, said program instructions being executable by one or more computing systems or controllers to cause said one or more computing systems to:
store said component-specific import key in a manufacturing-side storage system operated by a manufacture of the computing component, wherein the component-specific import key is protected by a manufacturing-side hardware security module; and
upon a request for said system-specific secret for a computing system:
identify, in said manufacturing-side storage system, said computing component comprised in said computing system;
retrieve, from said manufacturing-side storage system, a record relating to said identified computing component from said manufacturing-side storage system, said record comprising a unique component-specific import key;
identify, from the record, said system-specific secret protected by a manufacturing-side hardware security module;

identify, from the record, a system-specific auxiliary key protected by the manufacturing-side hardware security module;

encrypt, on said manufacturing-side, said system-specific auxiliary key with said retrieved component-specific import key, thereby creating an auxiliary key bundle, wherein said auxiliary key bundle comprises a bundle record comprising a reference to said computing component to which said component-specific import key relates and said system-specific auxiliary key encrypted by said component-specific import key;

encrypt said system-specific secret with said system-specific auxiliary key; and store said auxiliary key bundle and a system record comprising said encrypted system-specific secret in a storage medium of said computing system;

change said plurality of computing components of said computing system; and based on detecting said change, replace an existing auxiliary key bundle on a storage medium being part of said specific computing system by a new auxiliary key bundle relating to an updated version of said computing system.

* * * * *